(12) United States Patent
Tanaka

(10) Patent No.: US 6,848,753 B2
(45) Date of Patent: Feb. 1, 2005

(54) EMERGENCY BRAKE APPARATUS FOR VEHICLE

(75) Inventor: Satoshi Tanaka, Oyama (JP)

(73) Assignee: Komatsu Ltd., Tokyo (JP)

( * ) Notice: Subject to any disclaimer, the term of this patent is extended or adjusted under 35 U.S.C. 154(b) by 28 days.

(21) Appl. No.: 10/385,332

(22) Filed: Mar. 10, 2003

(65) Prior Publication Data

US 2003/0217899 A1 Nov. 27, 2003

(30) Foreign Application Priority Data

May 27, 2002 (JP) ..................................... P2002-152339

(51) Int. Cl.[7] .............................................. B60T 13/00
(52) U.S. Cl. ....................... 303/9.62; 303/113.5; 303/43
(58) Field of Search ............................. 303/9, 113.5, 3, 303/15, 9.62, 9.63, 37, 43

(56) References Cited

U.S. PATENT DOCUMENTS

| | | | | |
|---|---|---|---|---|
| 3,917,037 A | * | 11/1975 | Prillinger | ..................... 188/170 |
| 3,982,792 A | * | 9/1976 | Nakajima | ................... 303/9.61 |
| 4,697,852 A | * | 10/1987 | Scholz | ........................... 303/7 |
| 4,770,470 A | * | 9/1988 | Tarumizu et al. | .......... 303/6.01 |
| 5,791,750 A | * | 8/1998 | Spiegelberg | ................ 303/191 |

FOREIGN PATENT DOCUMENTS

| | | | | |
|---|---|---|---|---|
| JP | | 64-67469 A | * 3/1989 | ............. 188/106 P |

* cited by examiner

Primary Examiner—Matthew C. Graham
Assistant Examiner—Mariano Sy
(74) Attorney, Agent, or Firm—Frishauf, Holtz, Goodman & Chick, P.C.

(57) ABSTRACT

The invention provides an emergency brake apparatus for a vehicle which can brake both of front and rear tire wheels of a vehicle by using an oil pressure, at an emergency time. For this purpose, a pressure oil of a hydraulic power source is changed to a pilot oil pressure which is reduced from a high pressure to a low pressure in correspondence to an operation amount of an emergency brake valve (77) operated at the emergency time, and this pressure is output to a relay valve (3). The pressure oil of the hydraulic power source is increased in an inverse proportional manner from a low pressure to a high pressure in correspondence to the pilot oil pressure, and this pressure is output to a front tire wheel brake (64), thereby urgently braking the front tire wheel.

2 Claims, 5 Drawing Sheets

FOOT TYPE EMERGENCY
BRAKE PEDALING ANGEL

R : REAR TIRE WHEEL EMERGENCY BRAKING PRESSURE Cpb
    (PILOT OIL PRESSURE Pp)

F : FRONT TIRE WHEEL EMERGENCY BRAKING PRESSURE Cpf

EMERGENCY BRAKE APPARATUS FOR VEHICLE

FIELD OF THE INVENTION

The present invention relates to an emergency brake apparatus for a vehicle, and more particularly to an emergency brake apparatus used for a dump truck, a construction machine such as a traveling crane or the like, or an industrial vehicle.

BACKGROUND OF THE INVENTION

In conventional, in a brake apparatus of a dump truck traveling on a dirt road, a brake is actuated by pedaling a brake pedal, transmitting an air from a brake valve to a chamber cylinder in both of front tire wheels and rear tire wheels, converting the air into an oil pressure by the chamber cylinder, and operating a wheel cylinder on the basis of the oil pressure.

Further, in recent years, in order to improve a reliability and simplify a structure in the brake apparatus, there has been employed a full hydraulic brake system in which both of the front and rear tire wheels are controlled by the oil pressure.

In FIG. 5, a brake apparatus 61 employs a plurality of hydraulic accumulators 62a, 62b and 62c (hereinafter, refer to a hydraulic source 62) as a hydraulic source. A pressurized oil of the hydraulic source 62 is fed to a front tire wheel brake 64 and a rear tire wheel brake 65 via a foot type brake valve 63, thereby respectively controlling the tire wheels. The hydraulic source 62 receives a pressurized oil of a hydraulic pump 66 driven by a drive source 68 and accumulates the pressurized oil with a predetermined pressure, and unloads the pressurized oil in the hydraulic pump 66 by an unloading apparatus 67 in the case that the pressure reaches the predetermined pressure.

The foot type brake valve 63 is constituted by a front tire wheel brake valve 63a and a rear tire wheel brake valve 63b, and is structured such that when a pedal 63d is operated, the rear tire wheel brake valve 63b feeds the pressurized oil in the hydraulic source 62 to the rear tire wheel brake 65, and the front tire wheel brake valve 63a feeds the pressurized oil in the hydraulic source 62 to the front tire wheel brake 64, thereby braking respectively. An emergency and parking brake 70 is additionally provided in the rear tire wheel brake 65.

In the case that the emergency and parking brake 70 is used as a parking brake, a parking braking pressure Sp in a rear tire wheel cylinder chamber 72 is controlled by an electromagnetic parking brake valve 71 (hereinafter, refer to a parking valve 71), whereby a vehicle is parked. That is, the parking valve 71 is switched to a position b by a parking switch (not shown) at a time of parking, thereby shutting the pressurized oil of the hydraulic source 62, and returning the pressurized oil of the rear tire wheel cylinder 72 to a tank 73 so as to make the parking braking pressure Sp zero. Accordingly, a rear tire wheel brake 74 is pressed by the rear tire wheel spring 75 so as to be crimped, thereby parking the vehicle.

At a time of traveling, the parking valve 71 is switched to a position a, the pressurized oil of the hydraulic source 62 is supplied to the rear tire wheel cylinder chamber 72, and the parking braking pressure Sp is made high. Therefore, the parking braking pressure Sp within the rear tire wheel cylinder chamber 72 presses back the rear tire wheel spring 75 so as to open the rear tire wheel multi-disc brake 74 and move the vehicle.

On the other hand, in the case that the emergency and parking brake 70 is used as an emergency brake, an emergency braking pressure Cp in the rear tire wheel cylinder chamber 72 is controlled by a foot type emergency brake valve 77 (hereinafter, refer to an emergency valve 77), whereby the vehicle is emergency braked. That is, when a foot type pedal 78 is pedaled at a time of emergency, the emergency valve 77 reduces the pressurized oil of the hydraulic source 62 in response to the pedaling amount (amount of operation), and outputs the pressure to the rear tire wheel cylinder chamber 72 as the emergency braking pressure Cp. In this case, a brake valve spring 77a and a pilot pressure chamber 77b are additionally provided in one end side and another end side of the emergency valve 77, respectively.

At a time of traveling when the foot type pedal 78 is not pedaled, since the brake valve spring 77a presses a spool (not shown) against the pressurized oil introduced into the pilot pressure chamber 77b, the emergency valve 77 is at a position c for communicating the hydraulic source 62 with the rear tire wheel cylinder chamber 72. Accordingly, the emergency valve 77 outputs the pressurized oil in the hydraulic source 62 to the rear tire wheel cylinder chamber 72 via the parking valve 71 as a high emergency braking pressure Cp. The emergency braking pressure Cp presses back the rear tire wheel spring 75 so as to open the rear tire wheel multi-disc brake 74, thereby traveling the vehicle.

At a time of emergency when the foot type pedal 78 is pedaled, since a force of the pressurized oil introduced into the pilot pressure chamber 77b presses a spool (not shown) against the brake valve spring 77a, the emergency valve 77 is at a position d for communicating the tank 73 with the rear tire wheel cylinder chamber 72. Therefore, the emergency valve 77 reduces the pressurized oil of the hydraulic source 62 in response to the pedaling amount, and outputs the pressure to the rear tire wheel cylinder chamber 72 via the parking valve 71 as a low emergency braking pressure Cp. Since the rear tire wheel cylinder chamber 72 becomes a low pressure, the rear tire wheel spring 75 presses back so as to crimp the rear tire wheel multi-disc brake 74. In this case, since the rear tire wheel cylinder chamber 72 is exposed to the low emergency braking pressure Cp which is reduced in response to the pedaling amount, the crimping force of the rear tire wheel multi-disc brake 74 is adjusted, and it is possible to obtain the braking force at the emergency time in response to the pedaling amount.

In accordance with the structure mentioned above, all of the brake control is achieved by the oil pressure in the construction machine such as the dump truck or the like, however, in this case, the following problems are generated.

For example, when the foot type brake valve 63 bites foreign materials or the like thereinto and the operation thereof becomes hard, the emergency valve 77 is pedaled, whereby the emergency brake using the emergency and parking brake 70 provided in the rear tire wheel is operated.

At this time, only the parking brake provided in the rear tire wheel is operated in the emergency brake. Further, the emergency brake reduces the emergency braking pressure applied to the parking brake, and operates the mechanical type brake using the spring so as to brake. This is because in general, the mechanical type brake such as the rear tire wheel brake is not attached to the front tire wheel brake, and the front tire wheel brake can not be used as the emergency brake. It is advantageous that the emergency brake is divided into the front and rear tire wheels, however, since the conventional brake apparatus can not employ the emergency brake for the front tire wheel, the conventional brake is inferior to the case that the front and rear tire wheels are braked, in view of stopping the vehicle rapidly and stably.

Accordingly, it is desired to brake both of the front and rear tire wheels. In order to brake the front tire wheel by using a dry type single disc brake, it is necessary to continuously increase the emergency braking pressure inversely to the case of the rear tire wheel. That is, in order to brake both of the front and rear tire wheels, it is necessary to simultaneously carry out a process of increasing the emergency braking pressure in the front tire wheel and a process of reducing the emergency braking pressure in the rear tire wheel. On the contrary, there is a method of operating two pressure proportional control valves in a state of connecting the valves by a seesaw-shaped link. However, in the construction machine, a volumetric capacity and a weight of the apparatus are increased so as to secure a flow rate and a pressure, and there are many restrictions for mounting the apparatus on the vehicle, so that it is hard employ this method.

Further, it is possible to electrically control by using an electromagnetic proportional valve, however, in this case, incidental devices such as controllers, computers, sensors and the like are required, so that the control becomes complex. There is a risk that any problem is generated in a reliability, in the case that an electrical means is employed as a last means for the emergency stop.

It is possible to use the mechanical type brake together in the same manner as the rear tire wheel, however, a structure in this case becomes complex, the apparatus for the front tire wheel is large sized, and the vehicle becomes expensive.

SUMMARY OF THE INVENTION

The present invention is made by taking the problems mentioned above into consideration, and an object of the present invention is to provide an emergency brake apparatus for a vehicle in which a reliability is increased by a simple structure made such that an oil pressure is used for operating brakes in front and rear tire wheels at an emergency time, in a construction machine, an industrial vehicle and the like. In addition, it is an object to provide a relay valve which can supply a pressure oil in inverse proportion to a pilot oil pressure capable of being used at the emergency time.

In accordance with the present invention, there is provided an emergency brake apparatus for a vehicle comprises a hydraulic power source for supplying a pressure oil, a front tire wheel brake receiving the pressure oil so as to brake a front tire wheel, and a rear tire wheel brake receiving the pressure oil so as to brake a rear tire wheel, stopping the rear tire wheel by a spring so as to park the vehicle, and releasing the spring by the pressure oil so as to move the vehicle, wherein the pressure oil of the hydraulic power source is changed in pressure to a pilot oil pressure which is reduced from a high pressure to a low pressure in response to an operation amount of an emergency brake valve which is operated at an emergency time, thereby being output to a relay valve, and the pressure oil of the hydraulic power source is increased from a low pressure to a high pressure in an inverse proportional manner in response to the pressure of the pilot oil pressure received by the relay valve, thereby outputting to the front tire wheel brake so as to urgently brake the front tire wheel.

Further, the relay valve is constituted by a first spool receiving the pilot oil pressure so as to be operated, and a second spool pressed by the first spool against a spring so as to increase and decrease both an opening area between the hydraulic power source and an output port and an opening area between the output port and a tank, and setting the pressure oil in this hydraulic power source to an inverse proportional pressure in response to the received pilot oil pressure.

In accordance with the structure mentioned above, when the foot type brake valve bites the foreign materials or the like thereinto and the operation becomes hard, the emergency valve is pedaled, and the emergency valve outputs the emergency braking pressure which is obtained by reducing the pressure oil of the hydraulic power source from the high pressure to the low pressure in correspondence to the operation amount, to the pilot oil pressure. This emergency braking pressure is output to the parking brake in the rear tire wheel brake, and is output to the relay valve of the front tire wheel brake as the pilot oil pressure. The relay valve increases the pressure oil of the hydraulic power source in the inverse proportional manner from the low pressure to the high pressure in response to the applied pilot oil pressure from the high pressure to the low pressure, and outputs the pressure to the front tire wheel brake so as to urgently brake the front tire wheel.

As described above, in accordance with the present apparatus, the front tire wheel brake can be used as the emergency brake, both of the front and rear tire wheels can be urgently braked, and it is possible to rapidly and stably stop the vehicle. Further, the present apparatus can carry out the emergency braking of the front tire wheel on the basis of the oil pressure only by adding the relay valve, and it is possible to improve a durability and a reliability on the basis of a simple structure with reducing an increase of cost.

The relay valve receives the pilot oil pressure by the first spool and presses the second spool against the spring, and a moving amount of the second spool is changed in correspondence to a magnitude of the pilot oil pressure. In the case that the pilot oil pressure is large, the moving amount of the second spool becomes small, the tank and the output port are connected, and the output pressure becomes small. In the case that the pilot oil pressure is small, the moving amount of the second spool becomes large, the hydraulic power source and the output port are connected, and the output pressure becomes large. As described above, the relay valve outputs the pressure oil from the hydraulic power source with the pressure from the low pressure to the high pressure in the inverse proportional manner, in response to the pilot pressure from the high pressure to the low pressure.

Since the present relay valve can control the output pressure with respect to the pilot oil pressure, the present relay valve can be used in an anti-lock brake system (ABS). At this time, it is possible to charge the oil pressure to the pilot port and reduce the oil pressure in the output port at a time when the tire is likely to be locked, by charging the oil pressure from the brake pedal and connecting the output port to the brake cylinder.

In this case, the present relay valve can be used in a system excellent in a fail safe which can secure a brake operating pressure without applying the pilot oil pressure even when the devices in the ABS are out of order, in comparison with the conventional system which is directly controlled by the electromagnetic solenoid.

BEST MODE FOR CARRYING OUT THE INVENTION

A description will be given of an embodiment of an emergency brake apparatus for a vehicle in accordance with the present invention with reference to FIGS. 1 to 4. In this case, FIG. 1 is a hydraulic circuit diagram of a brake apparatus of a construction vehicle using an emergency brake apparatus 2 in accordance with the present invention, FIG. 2. is an enlarged cross sectional view of a relay valve 3 of the emergency brake 2, and FIG. 3 is a side elevational view of the relay valve 3.

Figure 1:
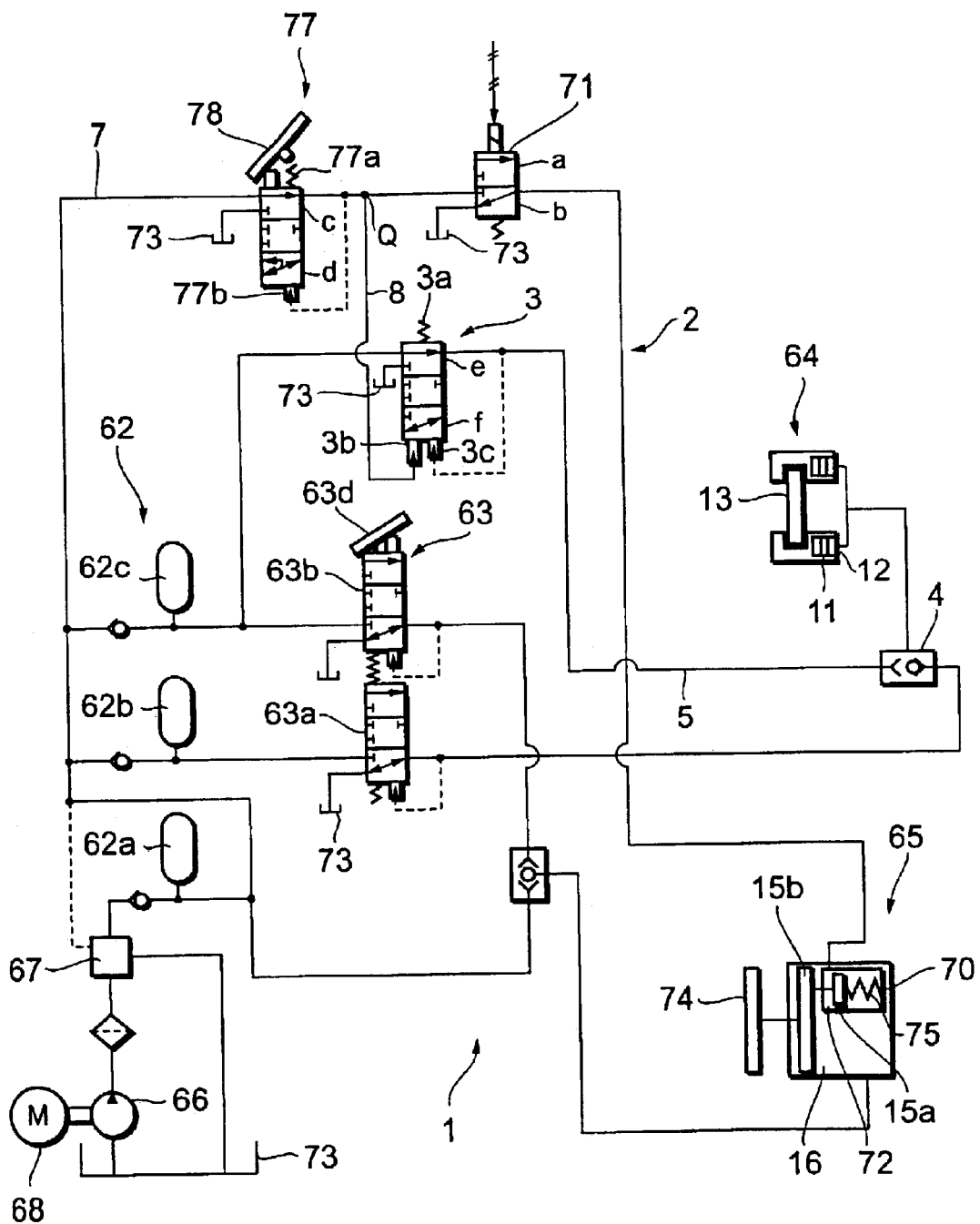
FIG. 1 is a hydraulic circuit diagram showing a brake apparatus for a construction vehicle in accordance with an embodiment of the present invention.
Figure 5:
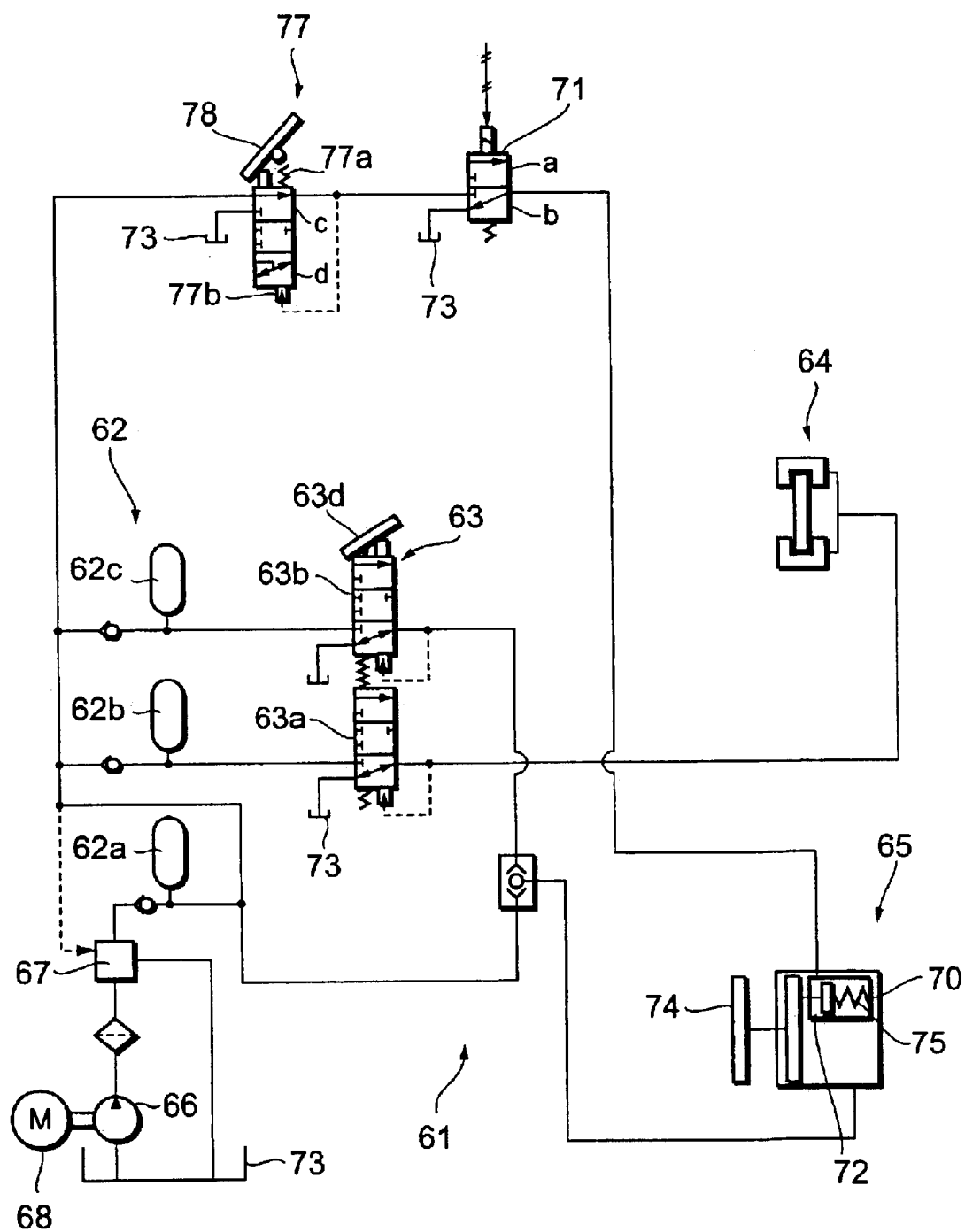
FIG. 5 is a hydraulic circuit diagram showing a brake apparatus for a dump truck in accordance with a conventional art.

The brake apparatus 1 in FIG. 1 is constructed by adding the emergency brake apparatus 2 for a front tire wheel to a conventional brake apparatus 61 shown in FIG. 5. Accordingly, the same reference numerals are attached to the same parts as those of the device shown in FIG. 5, and a description thereof will be omitted.

The emergency brake apparatus 2 is constructed by adding the relay valve 3 and a shuttle valve 4, and uses a front tire wheel brake 64 as an emergency brake and a braking brake. The relay valve 3 and the shuttle valve 4 are arranged in a first pipe passage 5 between the hydraulic power source 62 and the front tire wheel brake 64.

The relay valve 3 is positioned at a blocking position f at a normal traveling time so as to release the front tire wheel brake 64, is positioned at a communication position e at an emergency time so as to control the pressure oil of the hydraulic power source 62 in correspondence to the operation amount, and thereafter outputs a front tire wheel emergency braking pressure Cpf to the front tire wheel brake 64 via the shuttle valve 4.

The relay valve 3 is provided with a spring 3a in one end side, and a first pilot pressure chamber 3b and a second pilot pressure chamber 3c in another end side. The first pilot pressure chamber 3b is connected to a third pipe passage 8 which is provided in a downstream side of an emergency valve 77 and is branched from a point Q of the second pipe passage 7 having the emergency valve 77, and receives a rear tire wheel emergency braking pressure Cpb reduced in pressure by the emergency valve 77, as a pilot oil pressure Pp.

In the following description, the emergency braking pressure Cp output by the emergency valve 77 is described as the rear tire wheel emergency braking pressure Cpb in the case of being output to the rear tire wheel brake 65, and is described as the pilot oil pressure in the case of being supplied to the first pilot pressure chamber 3b of the relay valve 3. That is, the pilot oil pressure Pp which the first pilot pressure chamber receives has the same pressure as that of the pressure Cpb output to the emergency and parking brake 70, the pressure Cpb is generated by the foot type pedal 78 being operated at the emergency time and the pressure oil of the hydraulic power source being reduced in pressure in correspondence to the operation amount. Further, the second pilot pressure chamber 3c is connected to the first pipe passage 5 in a downstream side of the relay valve 3.

Figure 2:
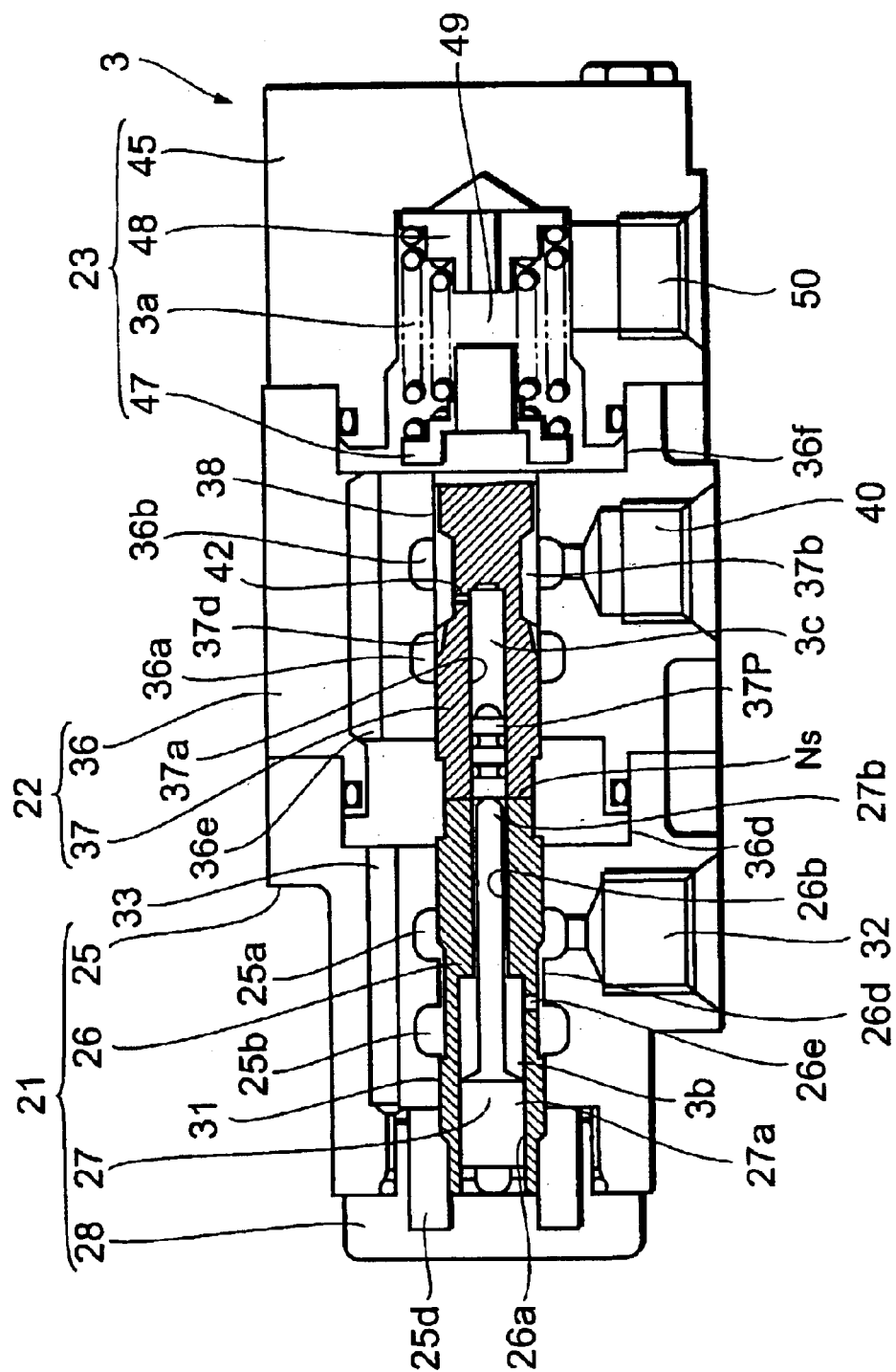
FIG. 2 is an enlarged cross sectional view of a relay valve of an emergency brake shown in FIG. 1.
Figure 3:
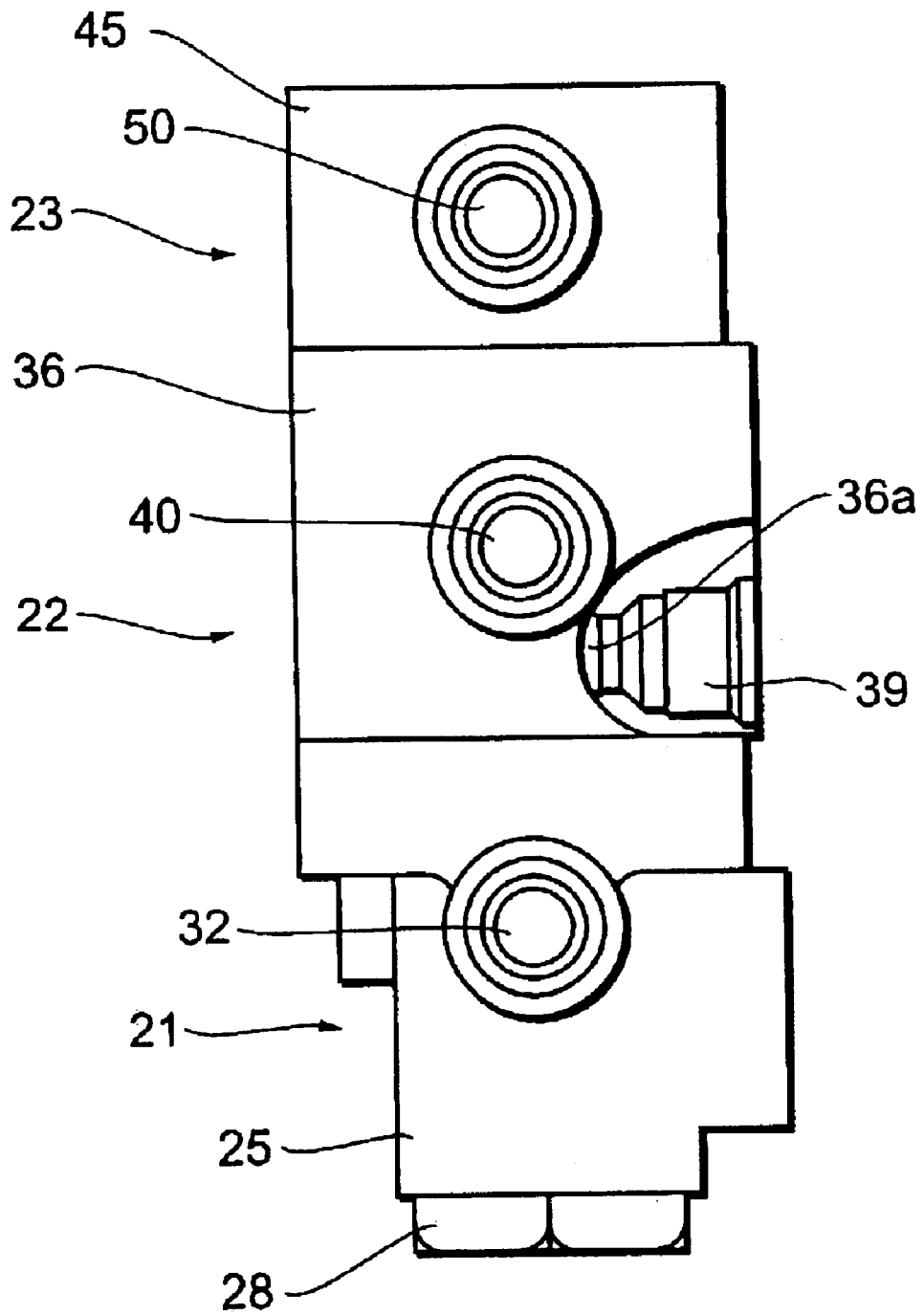
FIG. 3 is a side elevational view of the relay oil pressure valve shown in FIG. 2.
Figure 4:
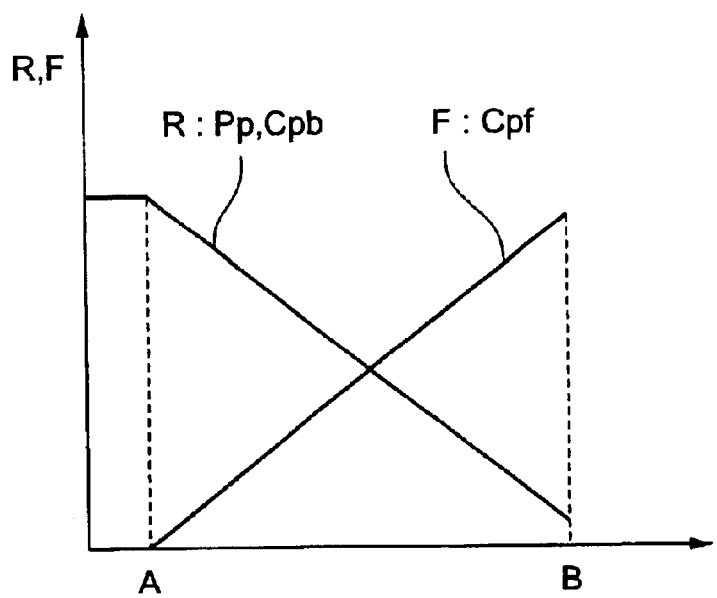
FIG. 4 is a schematic view of an operation of the relay valve in accordance with an embodiment of the present invention.

The relay valve 3 receives the pilot oil pressure Pp in the first pilot pressure chamber 3b, presses a pressure adjusting spool 37 corresponding to a second spool shown in FIG. 2 against the spring 3a, and outputs the pressure oil of the hydraulic power source 62 as the front tire wheel emergency braking pressure Cpf in inverse proportion to the pilot oil pressure Pp to the front tire wheel brake 64 via the shuttle valve 4.

Here, in the case that the pedaling amount (the operation amount) of the foot type pedal 78 is small and the pilot oil pressure Pp output to the relay valve 3 is large, the relay valve 3 changes the pressure oil of the hydraulic power source 62 to the small front tire wheel emergency braking pressure Cpf in inverse proportion to the pilot oil pressure Pp so as to output to the front tire wheel brake 64, thereby obtaining a small braking force.

On the other hand, in the case that the pedaling amount of the foot type pedal 78 is large and the pilot oil pressure Pp output to the relay valve 3 is small, the relay valve 3 changes the pressure oil of the hydraulic power source to the large front tire wheel emergency braking pressure Cpf in inverse proportion to the pilot oil pressure Pp so as to output to the front tire wheel brake 64, thereby obtaining a large braking force.

The shuttle valve 4 is connected to the relay valve 3 in one side, and is connected to the brake valve 63a for the front tire wheel in another side, compares the pressure of the relay valve 3 with the pressure of the brake valve 63a for the front tire wheel, and outputs the higher pressure to the front tire wheel brake 64.

Next, a description will be given of an operation of the emergency brake apparatus 2.

In the case that it is intended to brake during a normal traveling in the dump truck, an operator operates the foot type brake valve 63. In correspondence to the operation amount of the brake valve 63a for the front tire wheel interlocking therewith, the pressure oil of the hydraulic power source. 62 is reduced so as to become a front tire wheel braking pressure Bpf, and this pressure is supplied to a brake chamber 12 for the front tire wheel of a piston 11 for the front tire wheel via the shuttle valve 4, and presses a disc brake 13 for the front tire wheel so as to brake the front tire wheel. At this time, since the emergency valve 77 is not operated, the relay valve 3 is at the blocking position f, the brake chamber 12 for the front tire wheel and the tank 73 are connected, and a state in which the pressure is not established is achieved. The shuttle valve 4 selects the front tire wheel braking pressure Bpf, and supplies this pressure to the brake chamber 12 for the front tire wheel.

On the other hand, in the rear tire wheel brake 65, since a parking switch (not shown) is switched to a traveling position, and switches the parking valve 71 to a position a, the emergency valve 77 supplies the pressure oil of the hydraulic power source 62 to the rear tire cylinder chamber 72 as it is. The pressure oil of the rear tire cylinder chamber 72 presses back the parking piston 15a against the rear tire wheel spring 75, and releases the rear tire wheel multi-disc brake 74 so as to achieve the traveling state.

At this time, when the rear tire wheel brake 63b is operated, the pressure oil of the hydraulic power source 62 is reduced in pressure in correspondence to the operation amount so as to form the rear tire wheel braking pressure Bpr, and this pressure is supplied to the rear tire wheel brake chamber 16. The rear tire wheel brake 65 presses a piston 15b for a rear tire wheel brake on the basis of the pressing force of the rear tire wheel braking pressure Bpr so as to engage the rear tire wheel multi-disc brake 74, and brakes the rear tire wheel.

In such a state, if the operation thereof becomes hard at the emergency time, for example, in the case that the foreign materials or the like are bitten into the foot type brake valve 63, the operator releases the pedal 63d of the foot type brake valve 63, and pedals the foot type pedal 78 of the emergency valve 77. The emergency valve 77 reduces the pressure of the pressure oil of the hydraulic power source 62 to the emergency braking pressure Cp in correspondence to the pedaling amount (the operation amount), outputs this pressure as the rear tire wheel emergency braking pressure Cpb to the rear tire wheel brake 65, and simultaneously outputs the pressure as the pilot oil pressure Pp to the relay valve 3 connected to the front tire wheel brake 64.

In the rear tire wheel brake 65, since the pressure oil of the hydraulic power source 62 is reduced in pressure and supplied to the rear tire wheel emergency braking pressure Cpb, the force of the rear tire wheel spring 75 becomes stronger than the force of the rear tire wheel emergency braking pressure Cpb, the rear tire wheel spring 75 mechanically presses the parking piston 15a, and the rear tire wheel is urgently braked by the rear tire wheel multi-disc brake 74.

In the front tire wheel brake 64, the relay valve 3 receives the pilot oil pressure Pp reduced in pressure in correspondence to the operation amount mentioned above, and outputs the front tire wheel emergency braking pressure Cpf in inverse proportion to the pilot oil pressure Pp to one side of the shuttle valve 4. Since the pedal 63d is released in another side of the shuttle valve 4, the pressure oil is returned to the tank 73 from the front tire wheel brake valve 63a, and the pressure of the front tire wheel brake valve 63a is approximately zero. Then, the shuttle valve 4 selects the front tire wheel emergency braking pressure Cpf so as to supply the pressure oil to the front tire wheel cylinder chamber 12, and presses the front tire wheel multi-disc brake 13 by the front tire wheel piston 11 so as to urgently brake the front tire wheel.

As described above, at the emergency time, the foot type pedal 78 is operated, the emergency valve 77 reduces the pressure of the pressure oil of the hydraulic power source 62 in correspondence to the operation amount, and outputs the pressure as the rear tire wheel emergency braking pressure Cpb to the rear tire wheel cylinder chamber 72 of the rear tire wheel brake 65 as it is. At the same time, the reduced rear tire wheel emergency braking pressure Cpb is output to the relay valve 3 as the pilot oil pressure Pp, the relay valve 3 outputs the front tire wheel emergency braking pressure Cpf in inverse proportion to the rear tire wheel emergency braking pressure Cpb to the front tire wheel brake 64, and the front tire wheel brake 64 is used as the emergency brake.

Here, in the case that the operation amount of the foot type pedal 78 is small, the large rear tire wheel emergency braking pressure Cpb is output to the rear tire wheel cylinder chamber 72 in the rear tire wheel brake 65 so as to largely press back the rear tire wheel spring 75, and the rear tire wheel brake 65 urgently brakes the rear tire wheel by the small braking force. At the same time, the large rear tire wheel emergency braking pressure Cpb is output to the relay valve 3, however, since the pressure oil of the hydraulic power source 62 is controlled to the small front tire wheel emergency braking pressure Cpf by the relay valve 3 so as to be output to the front tire wheel brake chamber 12, the front tire wheel brake 64 also urgently brakes the front tire wheel by the small braking force.

On the other hand, in the case that the operation amount of the foot type pedal 78 is large, the small rear tire wheel emergency braking force Cpb is output to the rear tire wheel cylinder chamber 72 in the rear tire wheel brake 65 so as to press back the rear tire wheel spring 75 little, and the rear tire wheel brake 65 urgently brakes the rear tire wheel by the large braking force. At the same time, the small rear tire wheel emergency braking pressure Cpb is output to the relay valve 3, however, since the pressure oil of the hydraulic power source 62 is controlled to the front tire wheel emergency braking pressure Cpf by the relay valve 3 so as to be output to the front tire wheel brake chamber 12, the front tire wheel brake 64 also urgently brakes the front tire wheel by the large braking force. As described above, since both of the front and rear tire wheels are urgently braked by using the oil pressure, it is possible to rapidly and stably stop the vehicle.

Next, a description will be given of the relay valve 3 used in the emergency brake apparatus 2 with reference to FIGS. 2 and 3. The relay valve 3 is constituted by a pilot portion 21, a pressure adjusting portion 22 and a spring portion 23, and the respective portions are brought into contact with each other so as to be integrally formed. The pilot portion 21 is mainly constituted by a pilot valve main body 25, a pilot spool valve 26, a guide rod 27 and a pilot cover 28.

The pilot valve main body 25 is formed in a substantially hollow rectangular shape, and the pilot spool valve 26 corresponding to a first spool is slidably inserted into a spool hole 31 corresponding to a hollow portion of the pilot valve main body tightly. Two annular valve main body grooves 25a and 25b are formed in an outer side of the spool hole 31 in parallel with respect to a land, and a pilot port 32 provided on one surface of an outer shape of the pilot valve main body 25 is connected to one annular valve main body groove 25a. The pilot port 32 is connected to the point Q in the downstream side of the emergency valve 77 via the third pipe 8, and the pilot oil pressure Pp reduced in correspondence to the operation amount of the emergency valve 77 is supplied thereto. The pressure adjusting portion 22 is brought into contact with a side surface in a right side of the drawing of the pilot valve main body 25, and is attached by a bolt.

A hollow portion 25d is formed in a side surface portion in a left side of the drawing of the pilot valve main body 25, and the hollow portion 25d is connected to the pressure adjusting portion 22 arranged in a right side of the drawing by a drain hole 33.

The pilot spool valve 26 is formed in a hollow pipe shape, and a guide rod large diameter hole 26a and a guide rod small diameter hole 26b forming a step are formed in an inner side of the pilot spool valve 26. A guide rod 27 is tightly inserted into the guide road large diameter hole 26a and the guide rod small diameter hole 26b. An annular spool groove 26d is formed in an outer peripheral portion of the pilot spool valve 26 in such a manner as to be astride two annular valve main body grooves 25a and 25b. A throttle hole 26c connected to the annular valve main body groove 25b is pierced in the pilot spool valve 26.

The guide rod 27 is formed by a guide rod large diameter portion 27a and a guide rod small diameter portion 27b forming a step, and the guide rod large diameter portion 27a and the guide rod small diameter portion 27b are respectively inserted into the guide rod large diameter hole 26a and the guide rod small diameter hole 26b tightly. Further, the first pilot pressure chamber 3b is formed in an inner portion of the pilot spool valve 26 by the guide rod large diameter hole 26a and the guide rod small diameter 26b. The first pilot pressure chamber 3b is connected to the annular valve main body groove 25b via a throttle hole 26e.

The annular valve main body groove 25b is connected to the emergency valve 77 via the annular spool groove 26d, the annular valve main body groove 25a and the pilot ball 32. The pilot oil pressure Pp reduce in correspondence to the operation amount of the emergency valve 77 is supplied to the first pilot pressure chamber 3b via the pilot ball 32, the annular valve main body groove 25a, the annular spool groove 26d, the annular valve main body groove 25b and the throttle hole 26e.

The pilot oil pressure Pp of the first pilot pressure chamber 3b moves the pilot spool valve 26 in a right direction of the drawing in correspondence to the magnitude of the oil pressure. The first pilot pressure chamber 3b and the throttle hole 26e absorb a vibration of the supplied pilot oil pressure Pp so as to prevent the pilot spool valve 26 from vibrating.

The guide rod 27 is brought into contact with a center portion of the pilot cover 28 so as to be supported. The pilot cover 28 is mounted to a side surface in a left side of the drawing of the pilot valve main body 25 by being screwed, and prevents an internal drain oil from leaking.

The pressure adjusting portion 22 is mainly formed by a pressure adjusting valve main body 36 and a pressure adjusting spool valve 37 corresponding to a second spool. The pressure adjusting valve main body 36 is formed in an approximately hollow rectangular shape, and the pressure adjusting spool valve 37 is inserted into a pressure adjusting spool hole 38 in a hollow portion thereof slidably in a tight manner. Two annular valve main body grooves 36a and 36b are formed in an outer side of the pressure adjusting spool hole 38 in parallel with respect to the land.

An input port 39 provided on one surface of an outer shape in the pressure adjusting valve main body 36 as shown in FIG. 3 is connected to one annular valve main body groove 36a. An output port 40 provided on another surface of the outer shape in the pressure adjusting valve main body 36 is connected to another annular valve main body groove 36b.

The input port 39 is connected to the hydraulic power source 62, and supplies the pressure oil in the hydraulic power source 62 to the pressure adjusting portion 22. The output port 40 is connected to the shuttle valve 4 of the front tire wheel brake 64, and outputs the front tire wheel emergency braking pressure Cpf adjusted in correspondence to the pilot oil pressure Pp by the pressure adjusting portion 22 to the shuttle valve 4.

The pilot valve main body 25 is connected to a side surface in a left side of the drawing of the pressure adjusting valve main body 36 by a fitting portion 36d. A space is formed in the fitting portion 36d, and the drain oil from the hollow portion 25d of the pilot valve main body 25 is flowed into this space via the drain hole 33. The fitting portion 36d is connected to the spring portion 23 arranged in a right side of the drawing by the drain hole 33e, and collects the oil leaking from each of the spools in the spring portion 23.

The pressure adjusting spool valve 37 is formed in a columnar shape, and is provided with a guide rod small diameter hole 37a to which a plunger 37P is tightly inserted, in an inner side thereof. The pressure adjusting spool valve 37 is provided with an annular spool groove 37b on an outer periphery in such a manner as to be astride the annular valve main body groove 36b. The annular spool groove 37b connects the annular valve main body groove 36b to the tank 73 via the spring portion 23 in correspondence to the movement of the pressure adjusting spool valve 37. The second pilot pressure chamber 3c is formed by the guide rod small diameter hole 37a of the pressure adjusting spool valve 37 and a leading end of the plunger 37P. This second pilot pressure chamber 3c is connected to the annular valve main body groove 36b by a throttle hole 42.

The spring portion 23 is connected to a side surface in a right side of the drawing of the pressure adjusting valve main body 36 by a fitting portion 36f. Further, a notch portion 37d connecting the annular valve main body groove 36a to the annular valve main body groove 36b is provided on an outer periphery of the pressure adjusting spool valve 37. The notch portion 37d flows the pressure oil from the annular valve main body groove 36a to the annular valve main body groove 36b in correspondence to the movement of the pressure adjusting spool valve 37 so as to adjust the pressure.

In the case that the movement of the pressure adjusting spool valve 37 is large, the pressure adjusting spool valve 37 blocks between the annular valve main body groove 36a and the annular valve main body groove 36b, and also connects the annular valve main body groove 36b to the tank 73 via the spring portion 23 by the annular spool groove 37b. Accordingly, the output port 40 is connected to the tank 73 so as to be reduced in pressure, as well as the pressure oil input from the input port 39 is blocked.

The pilot spool valve 26 and the pressure adjusting spool valve 37, and the guide rod 27 and the plunger 37P are respectively brought into contact with each other at a position Ns existing in the fitting portion 36d between the pilot valve main body 25 and the pressure adjusting valve main body 36. Accordingly, an axis of the spool hole 31 of the pilot valve main body 25 may be slightly shifted from an axis of the pressure adjusting spool hole 38 of the pressure adjusting valve main body 36, it is not necessary to increase a working accuracy, and it becomes easy to work.

The spring portion 23 is mainly constituted by a spring case 45, the spring 3a and spring receivers 47 and 48. The spring case 45 is formed in an approximately hollow rectangular shape, and a hole for forming a spring chamber 49 receiving the spring 3a is pierced in a side of the pressure adjusting portion 22. The spring chamber 49 is connected to a tank port 50 provided on one surface of an outer shape of the spring chamber, and the spring chamber 49 collects the pressure oil leaking from each of the portions so as to return the pressure oil to the tank 73.

The spring 3a is mounted to one end side of the pressure adjusting spool valve 37 via the spring receiver 47 in one end thereof, and presses the pressure adjusting spool valve 37 to the pilot spool valve 26. Another end of the spring 3a is supported to the spring case 45 via the spring receiver 48. Further, the spring 3a receives a resultant force constituted by a force generated by the pilot spool valve 26 being applied the pilot oil pressure Pp of the first pilot pressure chamber 3b and a force generated by the pressure adjusting spool valve 37 being applied the pressure oil of the hydraulic power source 62 in the second pilot pressure chamber 3c so as to be deflected, reduces the pressure oil of the hydraulic power source 62 in correspondence to the pilot oil pressure Pp, and sets the pressure oil to the front tire wheel emergency braking pressure Cpf so as to output from the output port 40.

Next, a description will be given of an operation of the relay valve 3 used in the emergency brake apparatus 2, with reference to FIGS. 1 to 4.

When the relay valve 3 receives the rear tire wheel emergency braking pressure Cpb shown by a line R in FIG.

4 as the pilot oil pressure Pp, the relay valve 3 controls the pressure oil from the hydraulic power source in such a manner as to be in inverse proportion thereto, and outputs the pressure oil as the front tire wheel emergency braking pressure Cpf shown by a line F from the output port 40.

That is, the relay valve 3 receives the pressure oil of the hydraulic power source 62 in the input port 39, and supplies the pressure oil to the second pilot pressure chamber 3c via the annular valve main body groove 36a and the throttle hole 42. Further, when the relay valve 3 receives the pilot oil pressure from the emergency valve 77 in the pilot port 32, the relay valve 3 supplies the pilot oil pressure Pp to the first pilot pressure chamber 3b via the annular valve main body groove 25a, the annular spool groove 26d, the annular valve main body groove 25d and the throttle hole 26e.

Since the emergency valve 77 is not operated in the normal traveling, the pilot oil pressure Pp output by the emergency valve 77 is high. The first pilot pressure chamber 3b of the relay valve 3 receives this high pilot oil pressure Pp, and largely moves the pilot spool valve 26 and the pressure adjusting spool valve 37 in the right direction in FIG. 2 against the spring 3a on the basis of a large force.

The pressure adjusting spool valve 37 closes the annular valve main body groove 36a connected to the input port 39 in accordance with this movement, and blocks the pressure oil supplied to the output port 40 via the other annular valve main body groove 36b. After passing through the holding state, the pressure adjusting spool valve 37 connects the annular valve main body groove 36b (the output port 40) to the tank 73 by the annular spool groove 37b. Accordingly, in the output port 40, the front tire wheel emergency braking pressure Cpf becomes approximately 0 in correspondence to the high pilot oil pressure Pp, as shown by a point A in FIG. 4. Therefore, no braking force is generated in the front tire wheel brake 64, and a normal traveling is carried out.

On the other hand, the emergency valve 77 is operated at the emergency time, and the pressure oil of the hydraulic power source 62 is reduced in pressure in correspondence to the operation amount, and is output to the first pilot pressure chamber 3b of the relay valve 3 as the pilot oil pressure Pp. In accordance with the reduction of the pilot oil pressure Pp, and the pilot spool valve 26 and the pressure adjusting spool valve 37 are pressed back by the force of the spring 3a, and are returned to a left side as shown in FIG. 2. The smaller the pilot oil pressure Pp is, the larger the moving amount at this time is.

The pressure adjusting spool valve 37 blocks the tank 73 from the other annular valve main body groove 36b (the output port 40) on the basis of the movement. After passing through the holding state, the annular valve main body groove 36a connected to the input port 39 is opened, the annular valve main body groove 36a and the other annular valve main body groove 36b are connected to each other by the annular spool groove 37b, and the pressure oil of the hydraulic power source 62 is supplied to the output port 40 from the other annular valve main body groove 36.

At the same time, the second pilot pressure chamber 3c of the relay valve 3 receives the pressure from the annular valve main body groove 36b (the output port 40), and this pressure presses the pressure adjusting spool 37 to the right side against the spring force of the spring 3a. The pressure adjusting spool 37 closes the annular valve main body groove 36a when moving to a position balancing with the spring force of the spring 3a, thereby making the pressure of the output port 40 constant. The moving amount at this time is determined by the pilot oil pressure Pp. The smaller the moving amount is, the higher the pilot oil pressure Pp is, and the larger the moving amount is, the lower the pilot oil pressure Pp is.

As described above, the relay valve 3 outputs the front tire wheel emergency braking pressure Cpf in inverse proportion to the pilot oil pressure Pp in such a manner as to output the low front tire wheel emergency braking pressure Cpf in the case that the pilot oil pressure Pp is high and output the high front tire wheel emergency braking pressure Cpf at a time when the pilot oil pressure Pp is low.

In this case, in the present embodiment, the front tire wheel brake is set to the dry type disc brake, however, may be set to a drum type brake or a multi-disc brake which is the same as that of the rear tire wheel. Further, the structure is made such that the braking pressures of the emergency valve 77 and the front tire wheel brake 63a are selected by using the shuttle valve 4 in the front tire wheel brake 64, however, the structure may be made such that an emergency brake chamber is provided in the front tire wheel brake 64, and the shuttle valve 4 is not used.

What is claimed is:

1. An emergency brake apparatus for a vehicle comprising:

a hydraulic power source for supplying a pressure oil;

a front tire wheel brake receiving the pressure oil so as to brake a front tire wheel; and a rear tire wheel brake receiving the pressure oil so as to brake a rear tire wheel, stopping the rear tire wheel by a spring so as to park the vehicle, and releasing the spring by the pressure oil so as to move the vehicle, wherein the pressure oil of the hydraulic power source is changed in pressure to a pilot oil pressure which is reduced from a high pressure to a low pressure in response to an operation amount of an emergency brake valve which is operated at an emergency time, thereby being output to a relay valve, and the pressure oil of said hydraulic power source is increased from a low pressure to a high pressure in an inverse proportional manner in response to the pressure of the pilot oil pressure received by the relay valve, thereby outputting to said front tire wheel brake so as to urgently brake the front tire wheel.

2. An emergency brake apparatus for a vehicle as claimed in claim 1, wherein said relay valve is constituted by a first spool receiving said pilot oil pressure so as to be operated, and a second spool pressed by the first spool against a spring so as to increase and decrease both an opening area between said hydraulic power source and an output port and an opening area between the output port and a tank, and setting the pressure oil in this hydraulic power source to an inverse proportional pressure in response to said received pilot oil pressure.

* * * * *